United States Patent
Howey et al.

(10) Patent No.: US 12,412,908 B2
(45) Date of Patent: Sep. 9, 2025

(54) FUEL CELL SYSTEM

(71) Applicant: Robert Bosch GmbH, Stuttgart (DE)

(72) Inventors: Friedrich Howey, Ditzingen (DE); Gregory Rewers, Schwieberdingen (DE); Markus Reinoehl, Stuttgart (DE); Rolf-Peter Essling, Reudern (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 17/796,380

(22) PCT Filed: Jan. 26, 2021

(86) PCT No.: PCT/EP2021/051688
§ 371 (c)(1),
(2) Date: Jul. 29, 2022

(87) PCT Pub. No.: WO2021/151863
PCT Pub. Date: Aug. 5, 2021

(65) Prior Publication Data
US 2023/0046641 A1     Feb. 16, 2023

(30) Foreign Application Priority Data
Jan. 31, 2020   (DE) .................. 10 2020 201 195.8

(51) Int. Cl.
*H01M 8/04*         (2016.01)
*H01M 8/04014*     (2016.01)
(Continued)

(52) U.S. Cl.
CPC ... *H01M 8/04014* (2013.01); *H01M 8/04089* (2013.01); *H01M 8/04373* (2013.01); *H01M 8/04746* (2013.01); *H01M 8/247* (2013.01)

(58) Field of Classification Search
CPC ......... H01M 8/04014; H01M 8/04089; H01M 8/04373; H01M 8/04746; H01M 8/247
See application file for complete search history.

(56) References Cited

U.S. PATENT DOCUMENTS

| | | |
|---|---|---|
| 2011/0020715 A1 | 1/2011 | Shinoda et al. |
| 2014/0000275 A1 | 1/2014 | Kesseli et al. |
| 2018/0287179 A1* | 10/2018 | Rueger ................... C25B 15/02 |

FOREIGN PATENT DOCUMENTS

| | | |
|---|---|---|
| EP | 2963725 A1 | 1/2016 |
| JP | H0426194 A | 1/1992 |

(Continued)

OTHER PUBLICATIONS

Translation of International Search Report for Application No. PCT/EP2021/051688 dated Apr. 8, 2021 (2 pages).

*Primary Examiner* — Olatunji A Godo
(74) *Attorney, Agent, or Firm* — Michael Best & Friedrich LLP

(57) ABSTRACT

The invention relates to a fuel cell system (100) having at least one fuel cell stack (101), an air path (10), wherein air from the surroundings reach the fuel cell stack (101) via the air path (10), an exhaust gas path (12), a fuel line (20), wherein fuel is transported to the fuel cell stack (101) via the fuel line (20). According to the invention, the air path (10) is connected to a cooling line (30) via a branch (33), wherein the cooling line (30) is connected to a PDU unit (32).

6 Claims, 1 Drawing Sheet

(51) Int. Cl.
    *H01M 8/04089*    (2016.01)
    *H01M 8/0432*     (2016.01)
    *H01M 8/04746*    (2016.01)
    *H01M 8/247*      (2016.01)

(56) References Cited

FOREIGN PATENT DOCUMENTS

| | | | |
|---|---|---|---|
| JP | 2002050385 | A | 2/2002 |
| JP | 2008052997 | A | 3/2008 |
| JP | 2008192393 | A | 8/2008 |
| JP | 2009245814 | A | 10/2009 |
| JP | 2010153104 | A | 7/2010 |
| JP | 2013093256 | A | 5/2013 |
| JP | 2014151722 | A | 8/2014 |
| JP | 2016100160 | A | 5/2016 |
| JP | 2018139205 | A | 9/2018 |
| JP | 2020014263 | A | 1/2020 |

* cited by examiner

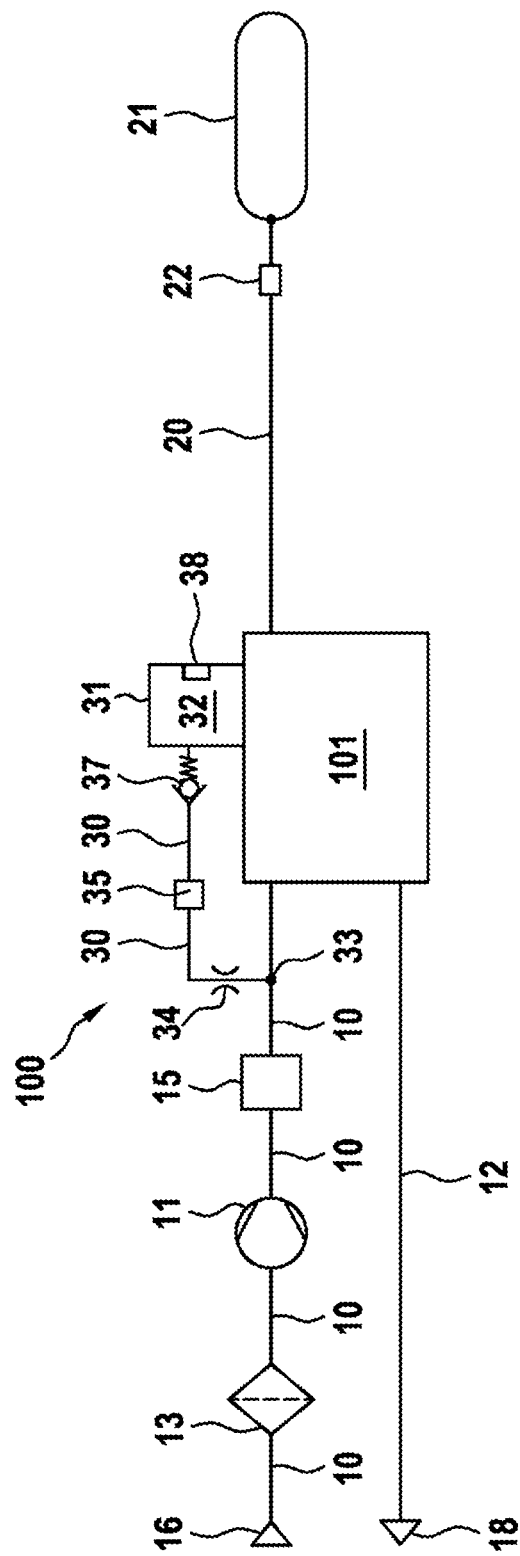

FUEL CELL SYSTEM

BACKGROUND OF THE INVENTION

The invention relates to a fuel cell system having at least one fuel cell stack, having an air path through which air from the environment reaches the fuel cell stack, having an exhaust gas path, and having a fuel line through which fuel is transported to the fuel cell stack.

Hydrogen-based fuel cells are seen as a mobility concept of the future, since they only emit water as an exhaust gas and enable rapid refueling times. Fuel cells are usually assembled to form a fuel cell stack. The fuel cell stacks need oxygen, in most cases taken from ordinary air from the environment, and fuel, in most cases hydrogen, for the chemical reaction.

In fuel cell systems, the voltage taps at the fuel cell stack are carried out and processed via a power distribution unit (PDU). The tasks of a PDU are typically: voltage protection, current measurement, disconnection of the stack voltage from the system in the event of an accident, connection of the stack voltage to the DC/DC converter, then to the battery.

The elements and components within the PDU are exposed to high heat development owing to electrical losses and resistances. For this reason, the PDU has to be cooled. Known cooling options are a separate fan within the housing of the PDU and/or water cooling.

SUMMARY OF THE INVENTION

The inventive fuel cell system is advantageous in that air for cooling the PDU is extracted from the air path (cathode path). Costs can thus be reduced, since there is no need to install a separate cooler which provides the necessary safety in the environment of the engine compartment and blows clean air into the housing of the PDU.

In contrast to water cooling, the elements of the PDU can be cooled directly, whereas, with water cooling, the components can only be cooled indirectly by airflows which are generated within the housing due to temperature gradients. A heat pipe and a Peltier element, which is used to cool the PDU, produce only a slight cooling effect in comparison to direct air cooling.

Effective cooling of the PDU can be ensured as a result of the inventive fuel cell system. The components of the PDU have electrical losses, which may be converted into heat so that, without effective cooling, the internal temperature of the PDU continues to increase and the components overheat and, in the worst case, fail.

An arrangement of the branch point between a compressor, which compresses the air in the air path, and the fuel cell stack is advantageous since a high pressure difference between the branch point and the environment can thus be produced, so that, when necessary, a sufficiently high air mass flow rate for cooling can flow to the PDU via the cooling line.

A heat exchanger, which is arranged between the compressor and the branch point, is advantageous since the temperature of the air which flows to the PDU can thus be further reduced.

A particular advantage is achieved by a filter, which is arranged in the air path between an input and the branch point, since the air which flows to the PDU is thus already cleaned of dust and small particles. Clean air is an important basic requirement for the electronic components within the PDU.

It is advantageous if an adjustable throttle is arranged in the cooling line since the quantity of air which flows to the PDU can thus be altered in a variable manner. In the case of a high thermal load on the components of the PDU, a high quantity of air can flow to the PDU via the adjustable throttle. In the case of a small thermal load, the adjustable throttle can reduce its cross section so that less air flows to the PDU.

If the air in the cooling line still has too high a temperature to ensure effective cooling, a cooler in the cooling line can further reduce the temperature so that greater cooling efficiency is achieved with the same quantity of air.

In this case, it is advantageous if the cooler is arranged between the adjustable throttle and the PDU since this ensures that only the air which flows to the PDU is cooled.

In the event of a stoppage of the fuel cell system, hydrogen may escape from the fuel cell stack into the air path. To prevent the penetration of hydrogen into the PDU, it is advantageous if a non-return valve is arranged in the cooling line. As a result of the non-return valve, the gas exchange between the fuel cell stack and the PDU upon a stoppage of the fuel cell system is prevented since, in the stopped state, the closing force of the non-return valve cannot be overcome by the air pressure at the branch point. This is very important since ignition sources may be present in the PDU, which could result in the ignition of a mixture of hydrogen and air.

It is advantageous if the PDU has a pressure equalizing element or a non-return valve via which the air can escape into the environment. In this case, the pressure equalizing element can be designed such that it is permeable to gases but prevents the entry of particles and moisture into the PDU.

BRIEF DESCRIPTION OF THE DRAWING

The single drawing FIGURE shows a fuel cell system embodying the invention.

The inventive fuel cell system and the inventive method are explained in more detail below with reference to the FIGURE.

DETAILED DESCRIPTION

In the FIGURE, a schematic topology of a fuel cell system 100 according to a first exemplary embodiment is shown with at least one fuel cell stack 101. The at least one fuel cell stack 101 has an air path 10, an exhaust gas path 12 and a fuel line 20. The at least one fuel cell stack 101 can be used for mobile applications with a high power requirement, for example in trucks, or for stationary applications, for example in generators.

The air path 10 serves as an air supply line in order to supply air from the environment to the fuel cell stack 101 via an inlet 16. Components which are required for the operation of the fuel cell stack 101 are arranged in the air path 10. An air compressor 11 and/or supercharger 11 can be arranged in the air path 10, which air compressor and/or supercharger compresses or draws in the air according to the respective operating conditions of the fuel cell stack 101. A heat exchanger 15 can be located downstream of the air compressor and/or supercharger 11, which heat exchanger cools the air in the air path 10 to a lower temperature.

Further components, such as humidifiers and/or valves, for example, can be provided within the air path 10. The fuel cell stack 101 is provided with oxygenated air via the air path 10.

The air path 10 is connected to a cooling line 30 via a branch point 33. Air from the air path 10 can arrive in a PDU 32 or the housing 31 of a PDU 32 via the cooling line 30. A PDU 32 is a power distribution unit 32, which carries out a voltage tap at the fuel cell stack 101 and processes and connects these voltage taps.

The tasks of a power distribution unit (PDU 32) are inter alia: voltage protection, current measurement, disconnection of the stack voltage from the system if an accident is detected, connection of the stack voltage to the DC/DC converter and/or to the battery.

The elements in the housing 31 of the PDU 32 can be cooled using the air from the air path 10, which arrives in the housing 13 of the PDU 32 via the cooling line 30.

The branch point 33 is preferably arranged between the compressor 11, which compresses the air in the air path 10, and the fuel cell stack 101. In order to provide the cooling line 30 with sufficient cold air, the heat exchanger 15 can be arranged between the compressor 11 and the branch point 33.

At least one filter 13, which filters particles and foreign bodies out of the air, can be arranged in the air path 10, between the input 16 and the branch point 33. The air which flows to the PDU 32 is thus already cleaned of unwanted particles and foreign bodies.

So that the air which arrives in the cooling line 30 from the air path 10 is controlled according to requirements, an adjustable throttle 34 can be arranged in the cooling line 30.

If the air which flows into the cooling line 30 from the air path 10 does not have the desired temperature, a cooler 35 can be arranged in the cooling line 30, which cooler further cools the air in the cooling line 30. In one embodiment, the cooler 35 can be arranged between the adjustable throttle 34 and the PDU 32.

A gas non-return valve 37 can furthermore be arranged in the cooling line 30, which gas non-return valve prevents hydrogen from the fuel cell stack 101 from diffusing into the cooling line 30 in the event of a stoppage of the fuel cell system 100.

The air which has arrived in the housing 31 of the PDU 32 via the cooling line 30 can be discharged back into the environment via at least one pressure equalizing element 38, which is arranged in the housing 31 of the PDU 32. In one embodiment, the pressure equalizing element 38 is permeable to gases but prevents the entry of particles and moisture into the PDU.

In an alternative embodiment, a further non-return valve 38 is arranged in the housing 31 of the PDU 32, via which non-return valve the air, which has arrived in the housing 31 of the PDU 32 via the cooling line 30, can escape into the environment.

The fuel cell system 100 furthermore has an exhaust gas path 12 in which water and further constituents of the air can be transported out of the air path 10 after its passage through the fuel cell stack 101 and into the environment via an outlet 18.

The fuel cell system 100 can furthermore have a cooling circuit, which is designed to cool the fuel cell stack 101. The cooling circuit is not shown in the FIGURE since it is not part of the invention.

The fuel line 20 has a high pressure tank 21 and a shut-off valve 22. Further components can be arranged in the fuel line 20 in order to supply fuel to the fuel cell stack 101 according to requirements. A circulation line can furthermore be provided, which is not shown in the FIGURE since it is not part of the invention.

What is claimed is:

1. A fuel cell system (100) having at least one fuel cell stack (101), having an air path (10) through which air from the environment reaches the fuel cell stack (101), having an exhaust gas path (12), and having a fuel line (20) through which fuel is transported to the fuel cell stack (101), wherein the air path (10) is connected to a cooling line (30) via a branch point (33), wherein the cooling line (30) is connected to a power distribution unit (PDU) (32),
   wherein at least one filter (13) is arranged in the air path (10) between an input (16) and the branch point (33),
   wherein an adjustable throttle (34) is arranged in the cooling line (30),
   wherein a cooler (35) is arranged in the cooling line (30), and
   wherein the cooler (35) is arranged between the adjustable throttle (34) and the PDU (32).

2. The fuel cell system (100) as claimed in claim 1, wherein the branch point (33) is arranged between a compressor (11), which compresses the air in the air path (10), and the fuel cell stack (101).

3. The fuel cell system (100) as claimed in claim 2, wherein a heat exchanger (15) is arranged between the compressor (11) and the branch point (33).

4. The fuel cell system (100) as claimed in claim 1, wherein a gas non-return valve (37) is arranged in the cooling line (30).

5. The fuel cell system (100) as claimed in claim 1, wherein the PDU (32) has a pressure equalizing element (38) or a non-return valve (38), via which the air can escape into the environment.

6. The fuel cell system (100) as claimed in claim 5, wherein the pressure equalizing element (38) is permeable to gases but prevents entry of particles and moisture into the PDU (32).

* * * * *